(12) United States Patent
Lai et al.

(10) Patent No.: US 7,314,390 B1
(45) Date of Patent: Jan. 1, 2008

(54) DRAWER-TYPE CARD CONNECTOR

(75) Inventors: Yaw-Huey Lai, Taipei County (TW); Chin-Hwa Wu, Taoyuan County (TW)

(73) Assignee: Tai-Sol Electronics Co., Ltd., Taipei (TW)

( * ) Notice: Subject to any disclaimer, the term of this patent is extended or adjusted under 35 U.S.C. 154(b) by 0 days.

(21) Appl. No.: 11/703,088

(22) Filed: Feb. 7, 2007

(30) Foreign Application Priority Data

Nov. 7, 2006 (TW) .............................. 95219652 U (51) Int. Cl.
*H01R 24/00* (2006.01)
(52) U.S. Cl. ....................................... 439/630; 439/159
(58) Field of Classification Search ................ 439/159, 439/630
See application file for complete search history.

(56) References Cited

U.S. PATENT DOCUMENTS

| | | | |
|---|---|---|---|
| 3,017,232 A * | 1/1962 | Schwab et al. ............. | 439/377 |
| 6,109,940 A * | 8/2000 | Chad et al. ................. | 439/141 |
| 6,805,589 B2 * | 10/2004 | Lee ............................ | 439/630 |
| 6,976,879 B2 * | 12/2005 | Shishikura et al. ......... | 439/630 |
| 7,081,020 B1 * | 7/2006 | Lee ............................ | 439/630 |
| 7,112,075 B1 * | 9/2006 | Su .............................. | 439/159 |
| 7,226,300 B2 * | 6/2007 | Khemakhem ............... | 439/135 |
| 2005/0159035 A1 * | 7/2005 | Shih ........................... | 439/159 |
| 2007/0105446 A1 * | 5/2007 | Lai et al. .................... | 439/630 |

* cited by examiner

*Primary Examiner*—Briggitte R. Hammond
*Assistant Examiner*—Larisa Tsukerman
(74) *Attorney, Agent, or Firm*—Bacon & Thomas, PLLC (57) ABSTRACT

A drawer-type card connector is composed of a base, a cover member, an ejecting device, a slide member, a left card-fastening device, and a right card-fastening device. The base includes a bottom plate. The slide member is slidably mounted in the base, including a top plate, a left sidewall, and a right sidewall. A receiving chamber is formed among the bottom plate of the base and the top plate, the left sidewall, and the right sidewall of the slide member, for receiving the inserted card. The left and right card-fastening devices are pivotably mounted at two sides of a front end of the slide member respectively and each have a fastening piece. When the card is inserted fully, the two fastening pieces hold two sides of a rear end edge of the card respectively, such that the left and right card-fastening devices fail to bounce outward and thus firmly hold the card inside the card connector.

10 Claims, 11 Drawing Sheets

DRAWER-TYPE CARD CONNECTOR

BACKGROUND OF THE INVENTION

1. Field of the Invention

The present invention relates generally to electronic card connectors, and more particularly, to a drawer-type card connector capable of firmly holding an inserted electronic card and preventing the card from disengagement therefrom.

2. Description of the Related Art

The currently available drawer-type card connector includes a base and a drawer-type slide member. An electronic card can be entirely placed in the slide member and moved into and out of the base together with the slide member. Because the rear end edge of the card does not particularly have means for firmly buckling itself, such card connector fails to firmly hold the card and the card is subject to disengagement from the card connector.

SUMMARY OF THE INVENTION

The primary objective of the present invention is to provide a drawer-type card connector which can firmly hold an inserted card and further prevent the card from disengagement therefrom.

The foregoing objective of the present invention is attained by the drawer-type card connector composed of a base, a cover member, an ejecting device, a slide member, and a plurality of contact terminals. The base includes a bottom plate, a rear sidewall, a left sidewall, and a right sidewall, the latter three of which extend upward from the bottom plate. The slide member is slidably mounted in the base, including a top plate, a left sidewall, a right sidewall, and a rear sidewall, the latter three of which extend downward from the top plate. A receiving chamber is formed among the bottom plate of the base and the top plate, the left sidewall, and the right sidewall of the slide member, for receiving the inserted card. The drawer-type card connector further includes a left card-fastening device and a right card-fastening device, which are pivotably mounted at the left and right sides of a front end of the slide member respectively and each have a fastening piece. When the card is inserted fully, the left and right sidewalls of the base contact against the left and right card-fastening devices respectively to enable the two fastening pieces to hold the left and right sides of a rear end edge of the card respectively. In light of this, the left and right card-fastening devices fail to bounce outward and thus firmly hold the card inside the card connector.

DETAILED DESCRIPTION OF PREFERRED EMBODIMENTS

Referring to FIGS. 1-8, a drawer-type card connector constructed according to a first preferred embodiment of the present invention is composed of a base 1, a plurality of contact terminals 2, a cover member 3, a slide member 4, an ejecting device, a left card-fastening device 5, and a right card-fastening device 6, for receiving an electronic card 7 inserted therein.

Figure 1:
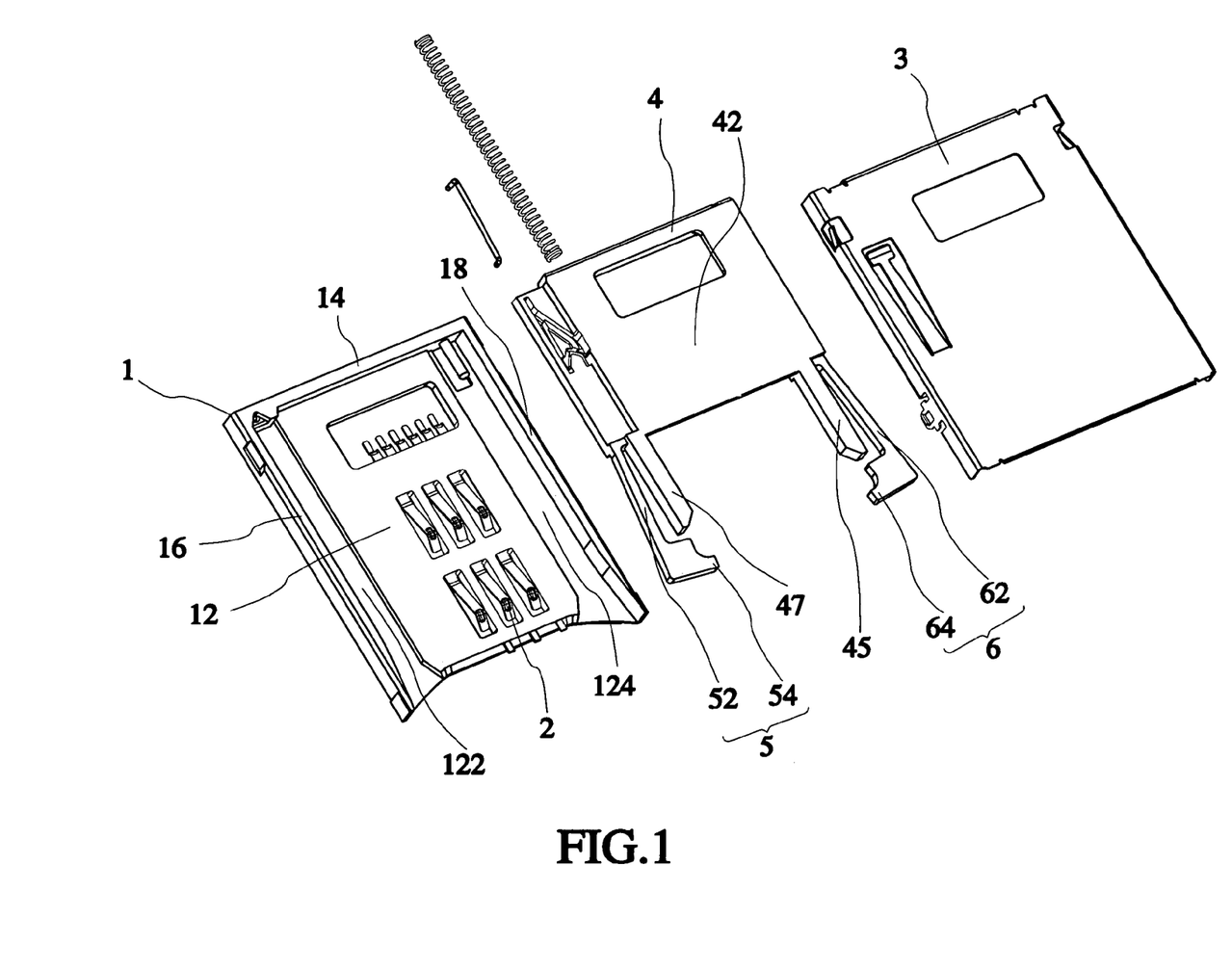
FIG. 1 is an exploded view of a first preferred embodiment of the present invention.

The base 1 includes a bottom plate 12, a rear sidewall 14 extending vertically upward from a rear end of the bottom plate 12, a left sidewall 16 extending vertically upward from a left end of the bottom plate 12, and a right sidewall 18 extending vertically upward from a right end of the bottom plate 12. The bottom plate 12 has a left slide way 122 located close to the left sidewall 16 and extending along a direction that the card 7 is inserted into the card connector, and a right slide way 124 located close to the right sidewall 18 and extending along the direction that the card 7 is inserted into the card connector.

The contact terminals 2 are mounted to a midsection of the bottom plate 12.

The cover member 3 is buckled onto the base 1.

Figure 2:
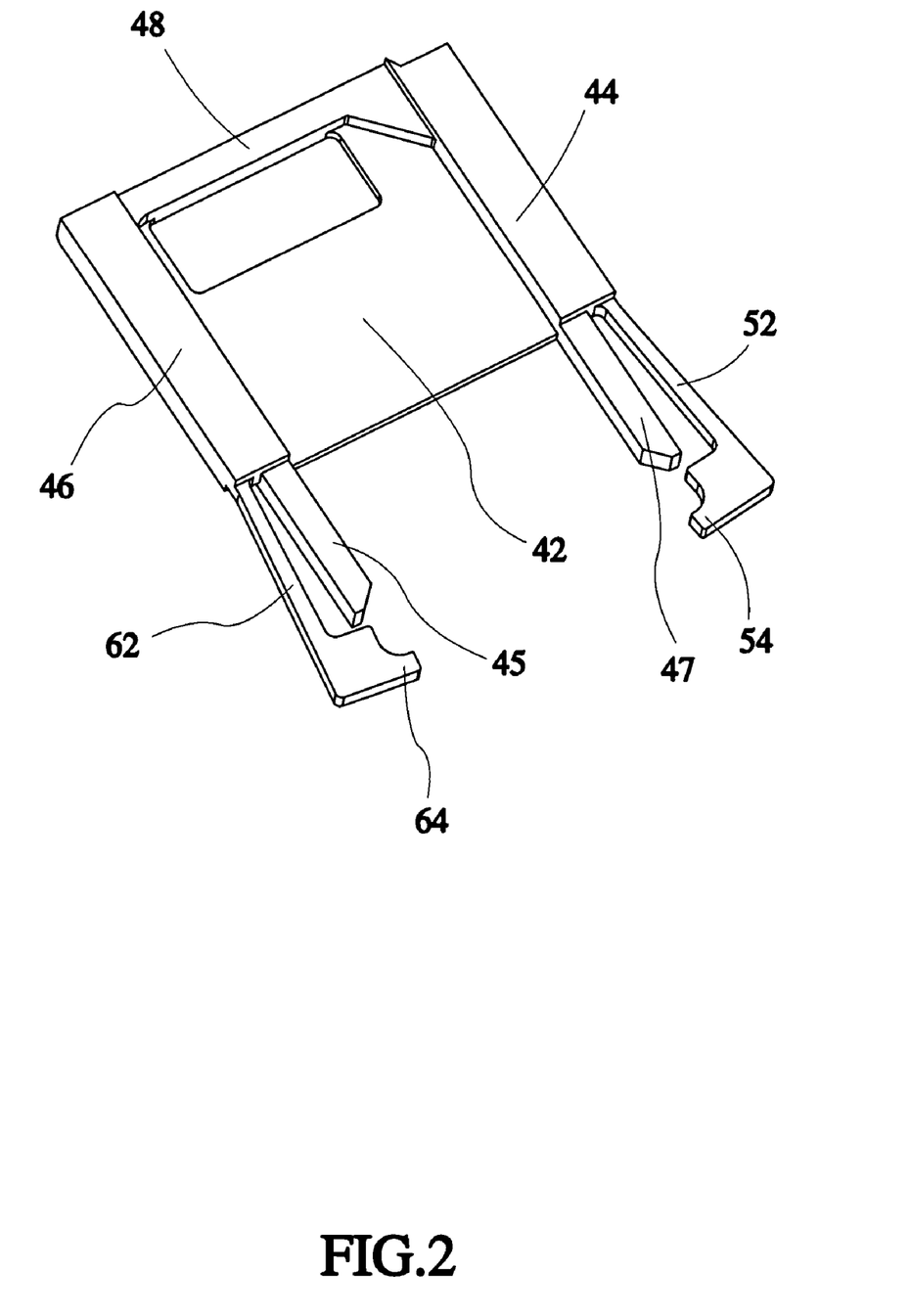
FIG. 2 is a perspective view of the slide member according to the first preferred embodiment of the present invention.
Figure 3:
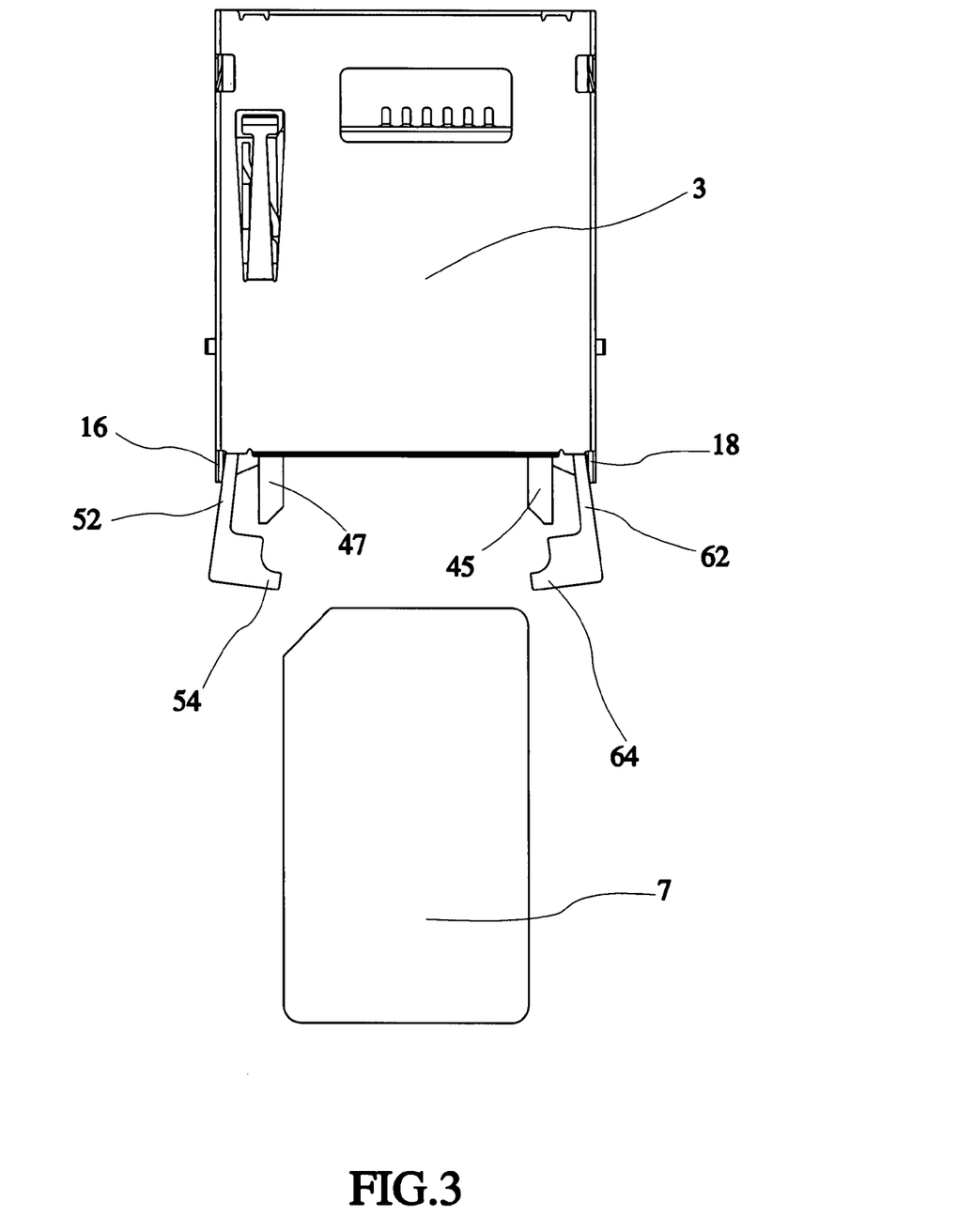
FIG. 3 is a top view of the first preferred embodiment of the present invention, showing that the card has not been inserted.
Figure 4:
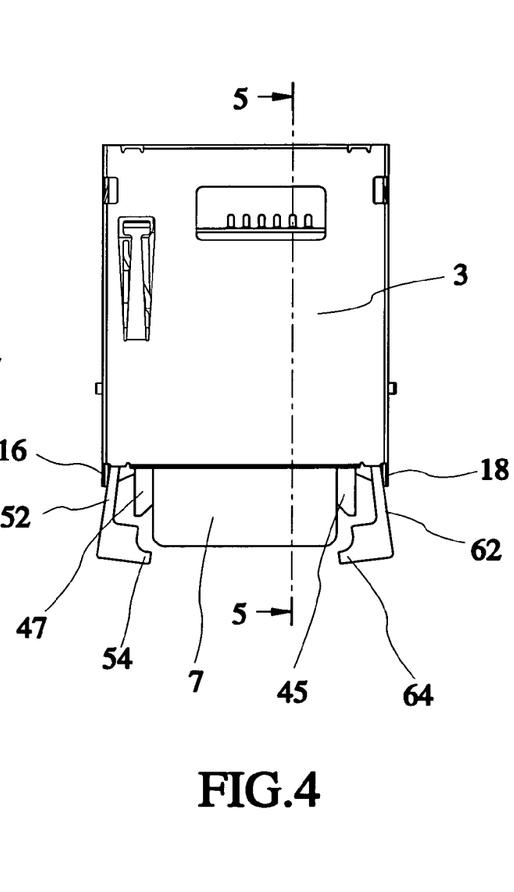
FIG. 4 is another top view of the first preferred embodiment of the present invention.
Figure 5:
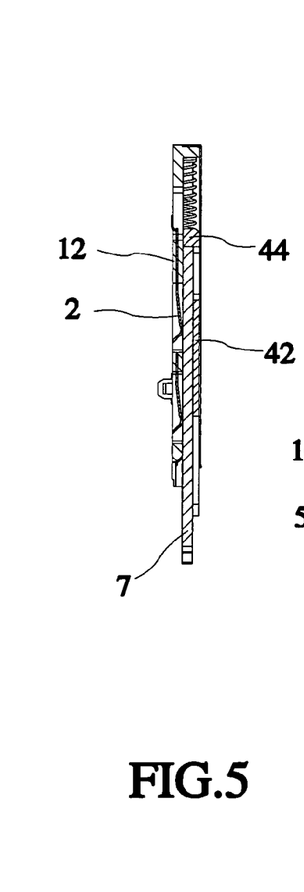
FIG. 5 is a sectional view taken along a line 5-5 indicated in FIG. 4.

The slide member 4 is slidably mounted in the base 1, including a top plate 42, a left sidewall 44 extending vertically downward from a left end of the top plate 42, a right sidewall 46 extending vertically downward from a right end of the top plate 42, and a rear sidewall 48 extending vertically downward from a rear end of the top plate 42. The slide member 4 further has a left positioning bar 47 protruding forward from a front end of the left sidewall 44, and a right positioning bar 45 protruding forward from a rear end of the right sidewall 46. A receiving chamber for receiving the card 7 is formed among the bottom plate 12 of the base 1 and the top plate 42, the left sidewall 44, and the right sidewall 46 of the slide member 4.

When the slide member 4 is slidably moved in the base 1, the left sidewall 44 is slidably moved in the left slide way 122 along the direction that the card 7 is inserted. The right sidewall 46 is slidably moved in the right slide way 124 along the same direction.

The left card-fastening device 5 includes a springy fastening bar 52 extending forward from a front end of the left sidewall 44, and a fastening piece 54 protruding rightward from a front end of the fastening bar 52. The fastening bar 52 extends leftward forward while bearing no external pressure. While pushed rightward, the fastening bar 52 is pivotable rightward.

The right card-fastening device 6 includes a springy fastening bar 62 extending forward from a front end of the right sidewall 46, and a fastening piece 64 protruding leftward from a front end of the fastening bar 62. The fastening bar 62 extends rightward forward while bearing no external pressure. While pushed leftward, the fastening bar 62 is pivotable leftward.

The ejecting device includes a guide bar, a spring, and a heart-shaped groove formed on the slide member 4, for facilitating successful sliding movement of the slide member 4 and ejection of the card 7. Because the ejecting device belongs to the prior art, no detailed description is necessary.

Figure 6:
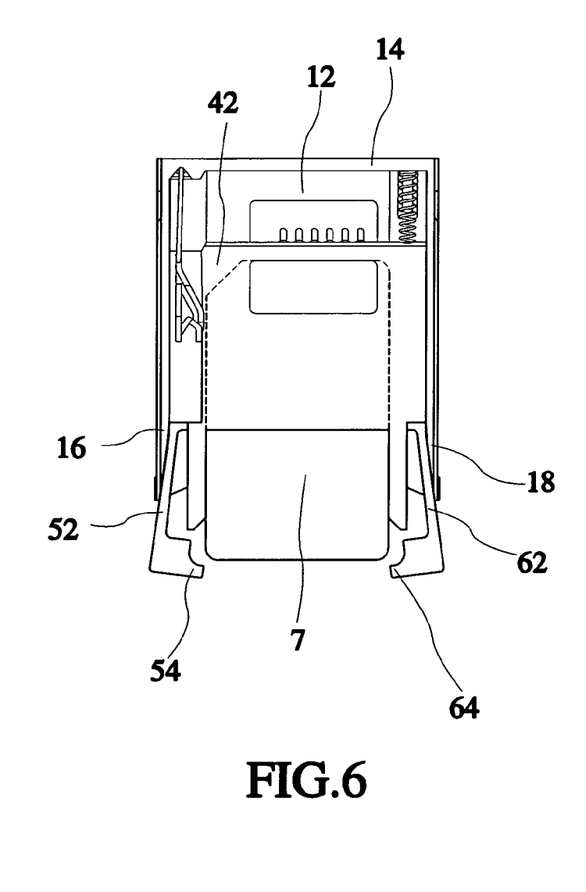
FIG. 6 is similar to FIG. 4, showing the top plate is removed from the card connector.
Figure 7:
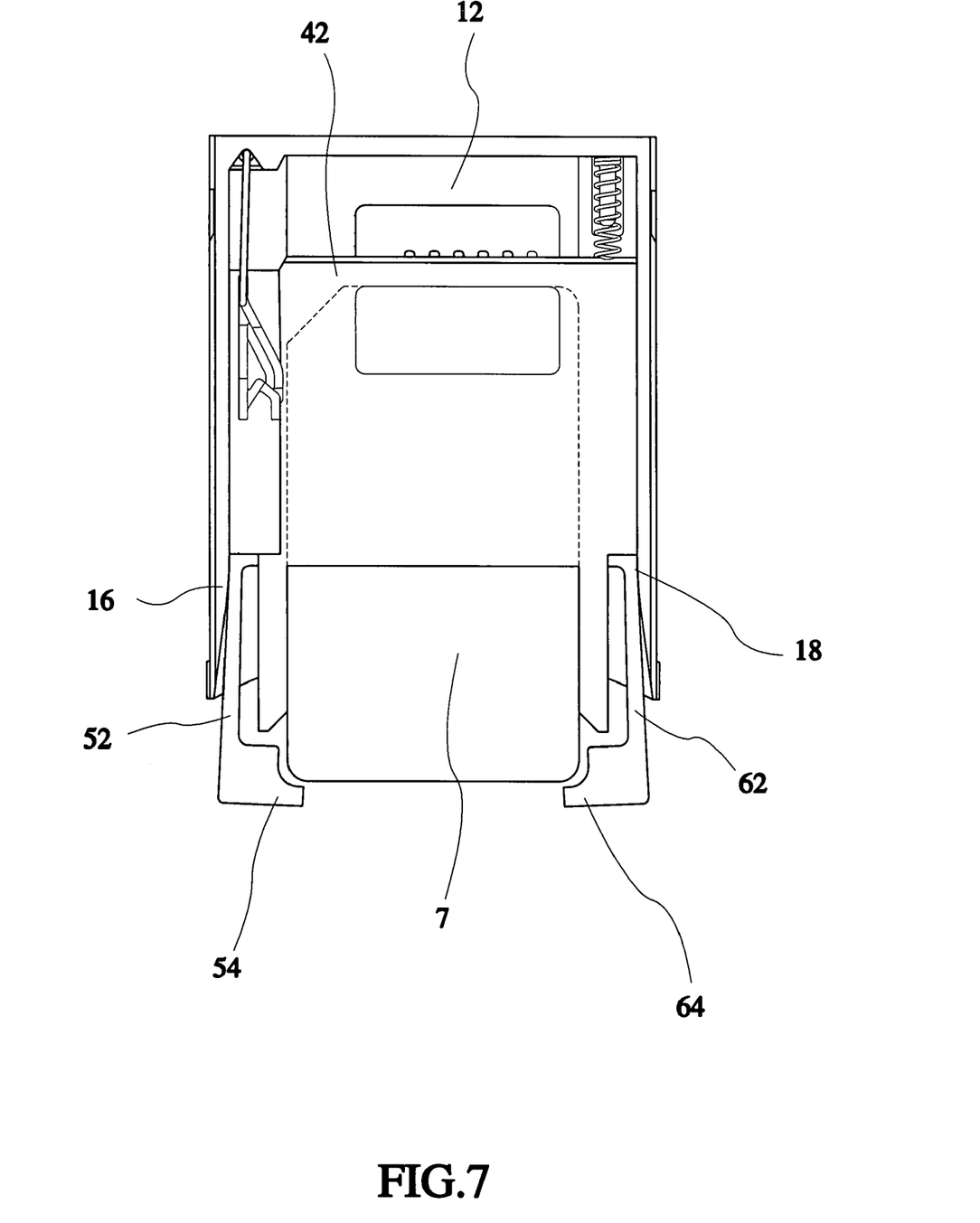
FIG. 7 is similar to FIG. 6, showing the card is inserted further.
Figure 8:
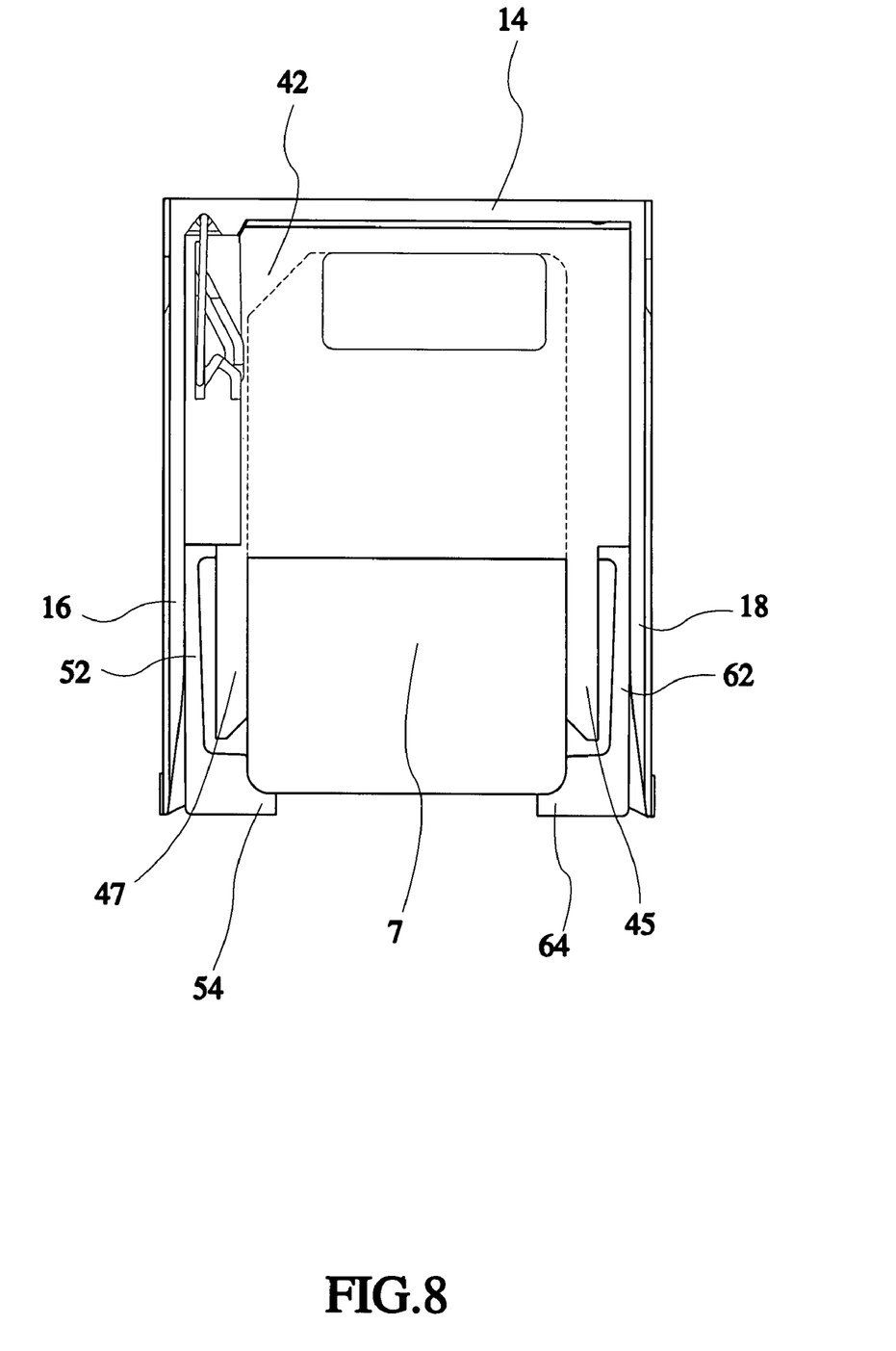
FIG. 8 is similar to FIG. 7, showing the card is fully inserted.

When a user intends to insert the card 7 into the card connector, the user can insert the card 7 through the left and right positioning bars 47 and 45 into the receiving chamber. When a front end of the card 7 contacts against the rear sidewall 48 of the slide member 4 and then the card 7 continues to be pushed further to drive the slide member 4 to move toward the rear sidewall 14 of the base 1, the fastening bars 52 and 62 are forced by the left and right sidewalls 16 and 18 respectively to move toward the card 7. When the card 7 is fully inserted and positioned, contact pins (not shown) of the card 7 right contact the contact terminals 2 for electric conduction and the fastening pieces 54 and 64 hold the left and right sides of a rear end edge of the card 7 respectively. In the meantime, the left and right sidewalls 16 and 18 hold the left and right card-fastening devices 5 and 6, such that the fastening bars 52 and 62 cannot bounce bilaterally outward, thus firmly holding the card 7 inside the card connector.

Referring to FIGS. 9-14, a drawer-type card connector constructed according to a second preferred embodiment of the present invention is similar to that of the first embodiment and composed of the same base 1, the same contact terminals 2, the same cover member 3, a slide member 8, an ejecting device, a left card-fastening device 9, and a right card-fastening device 10, for receiving the card 7.

Figure 9:
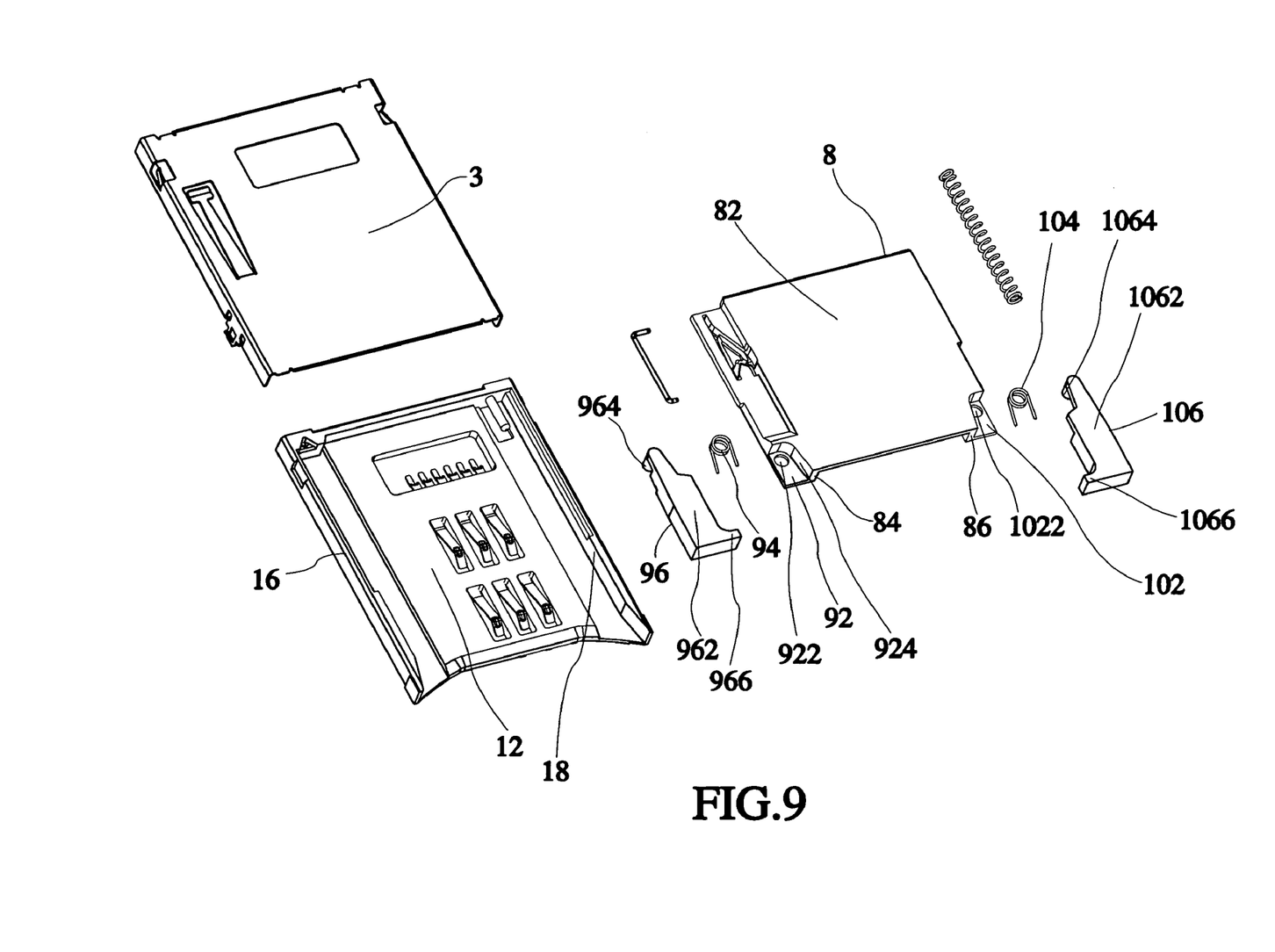
FIG. 9 is an exploded view of a second preferred embodiment of the present invention.
Figure 10:
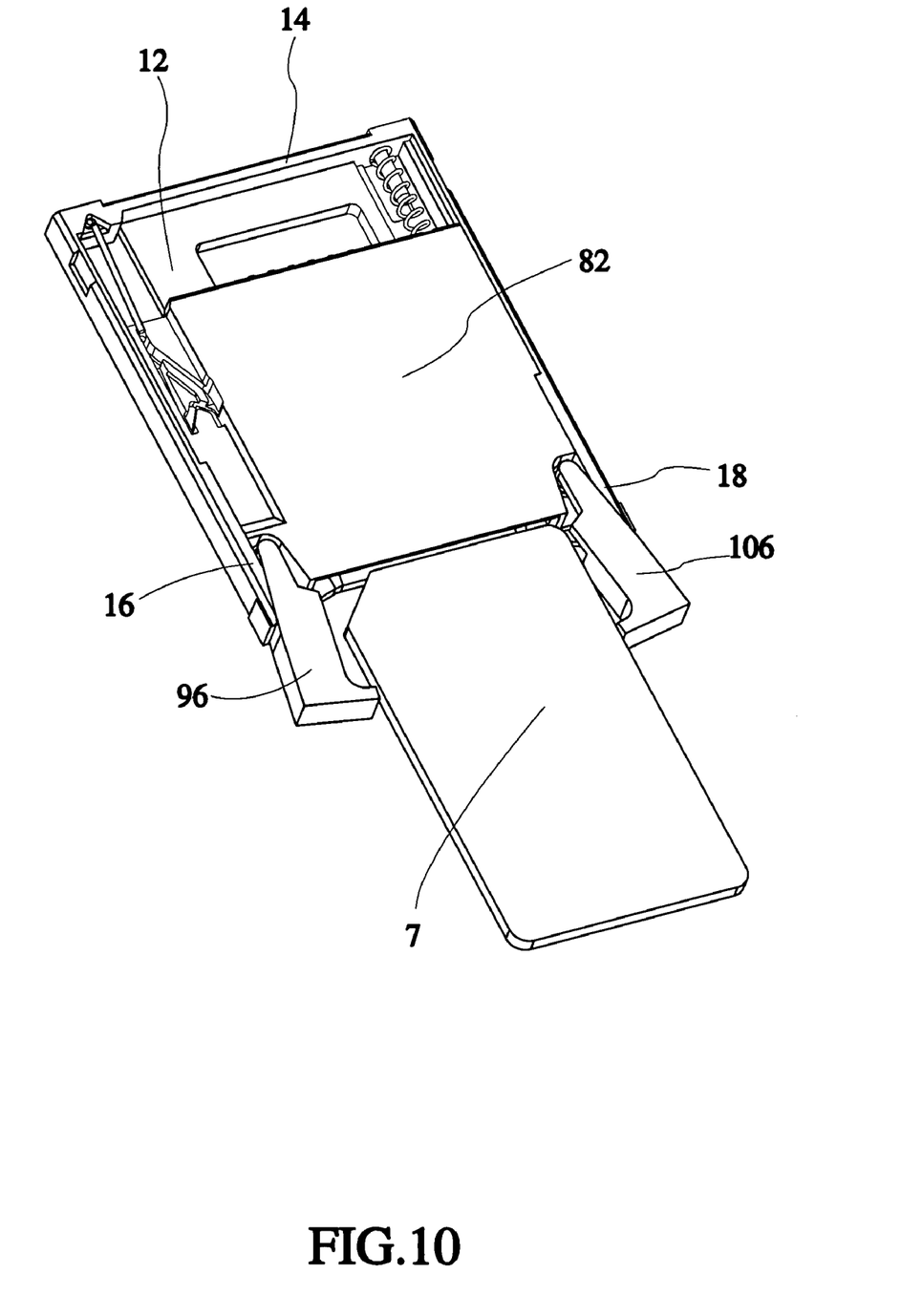
FIG. 10 is a perspective view of the second preferred embodiment of the present invention, showing that the card has not inserted.
Figure 11:
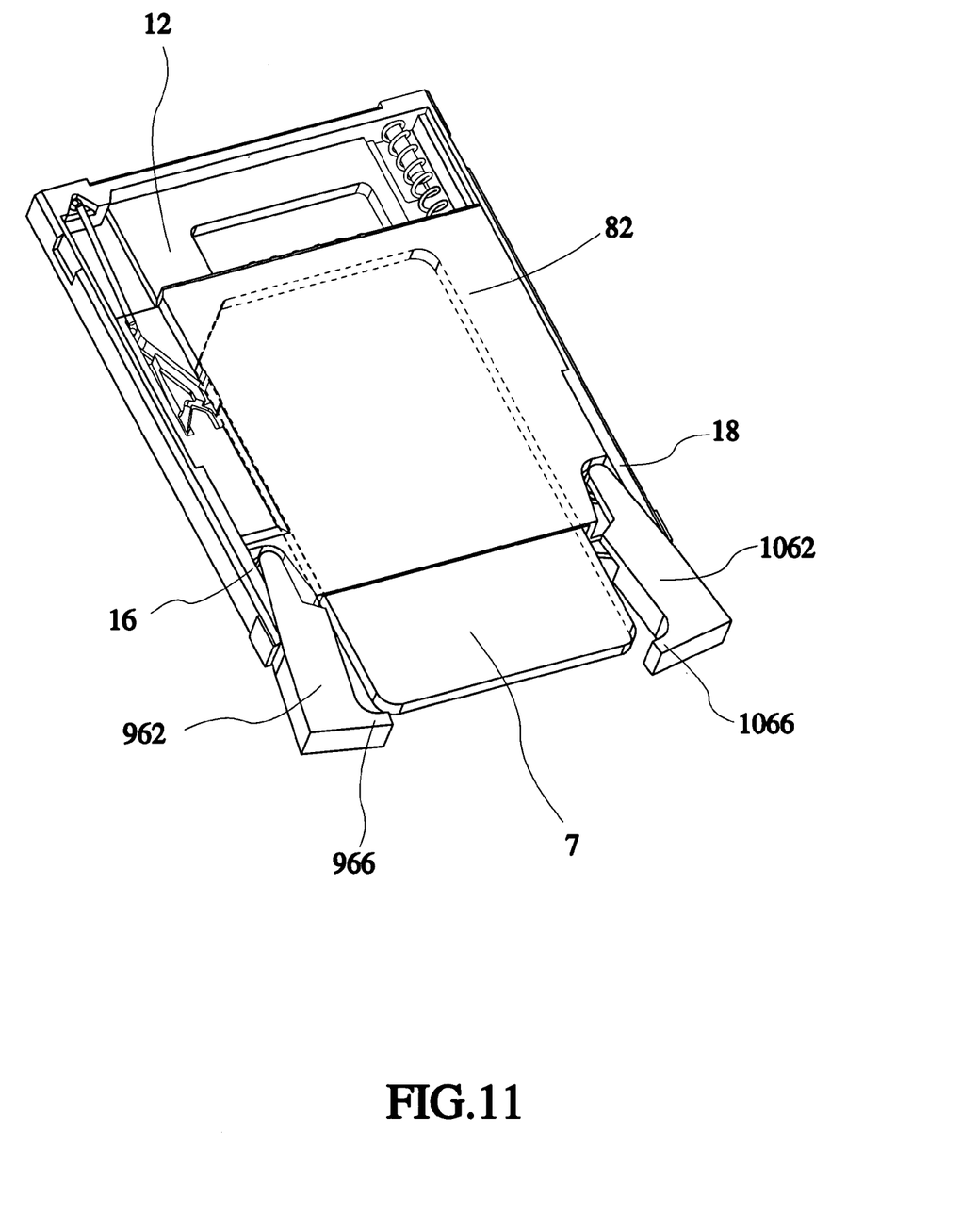
FIG. 11 is similar to FIG. 10, showing the card is being inserted.
Figure 12:
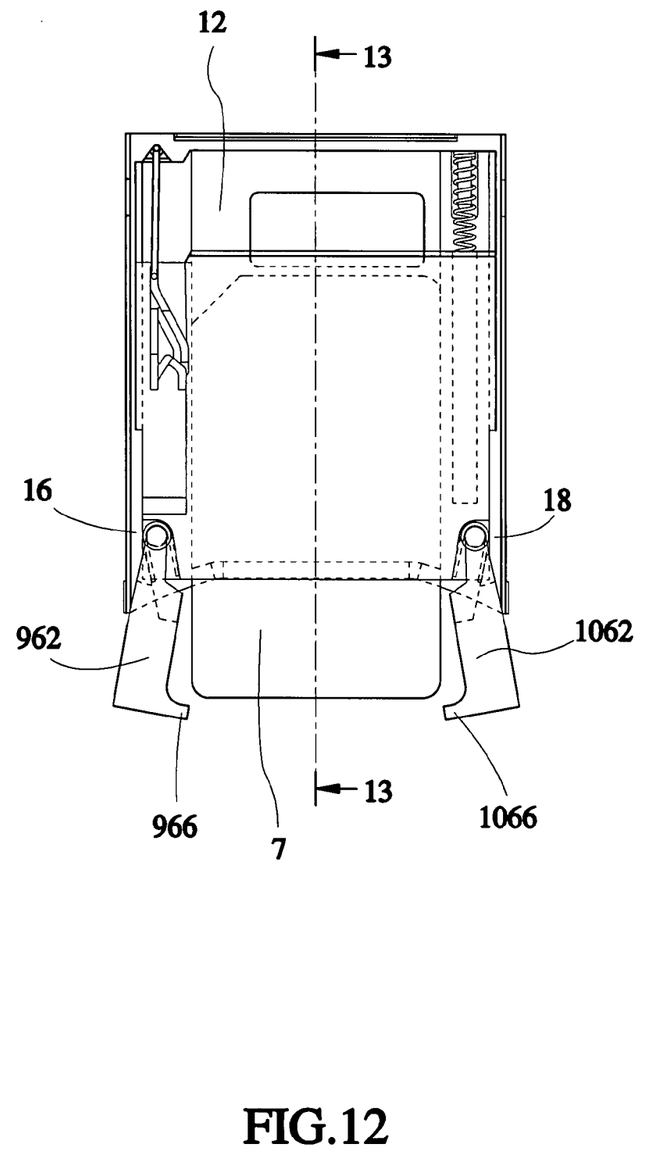
FIG. 12 is a top view of the second preferred embodiment of the present invention, showing that he card is inserted further.
Figure 13:
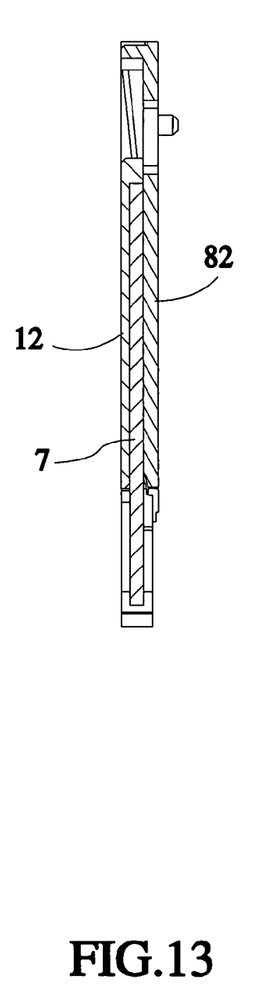
FIG. 13 is a sectional view taken along a line 13-13 indicated in FIG. 12.
Figure 14:
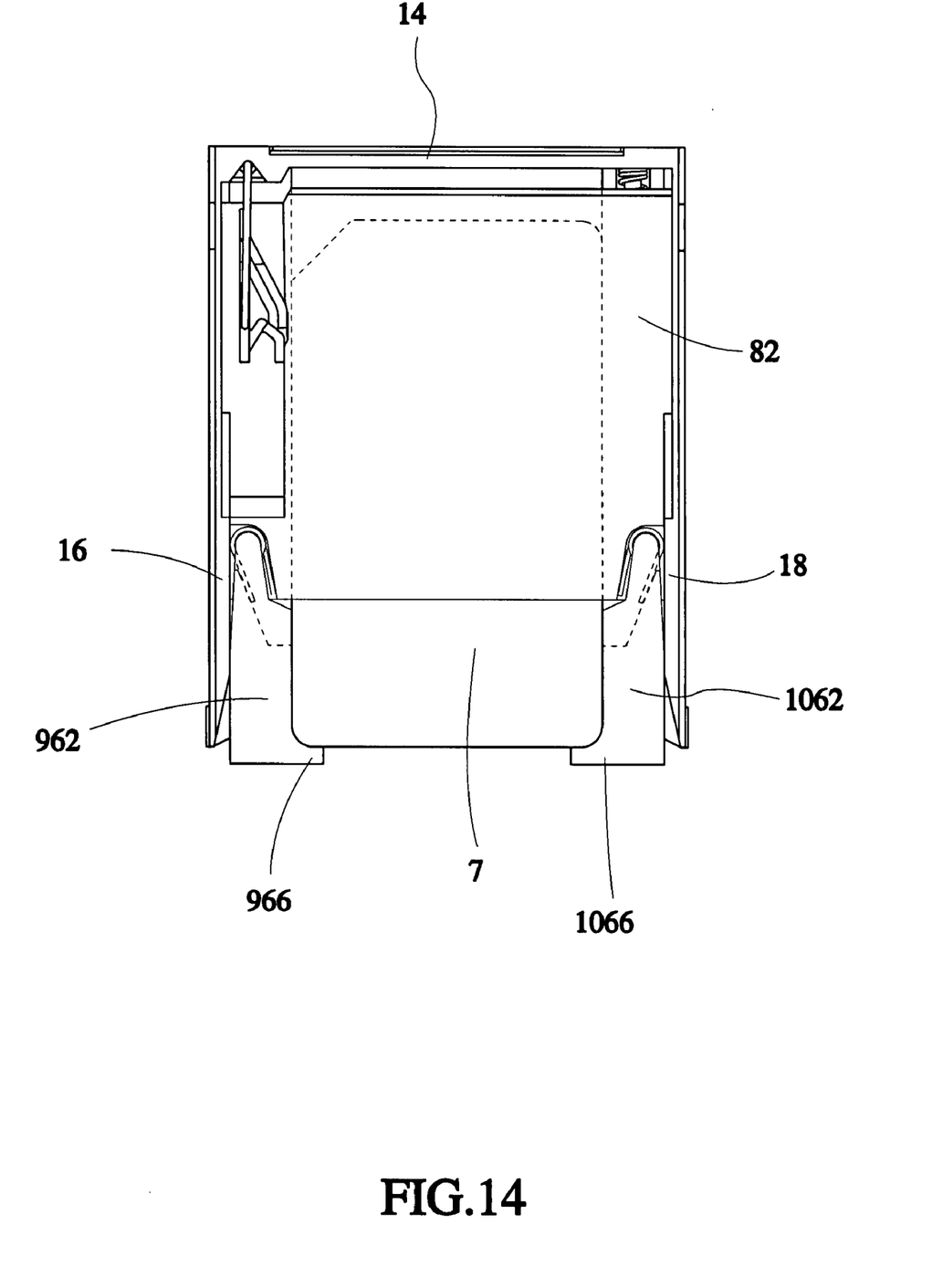
FIG. 14 is similar to FIG. 12, showing the card is fully inserted.

The contact terminals 2 are mounted to the midsection of the base plate 12.

The cover member 3 is buckled onto the base 1.

The ejecting device includes a guide bar, a spring, and a heart-shaped groove formed on the slide member 8, for facilitating successful sliding movement of the slide member 8 and ejection of the card 7. Because the ejecting device belongs to the prior art, no detailed description is necessary.

The slide member 8 includes a top plate 82, a left sidewall 84 extending vertically downward from a left end of the top plate 82, a right sidewall 86 extending vertically downward from a right end of the top plate 82, and a rear sidewall 88 extending vertically downward from a rear end of the top plate 82.

The left card-fastening device 9 includes a pivot recession 92 formed at a front end of the left sidewall 84, a first springy member 94, and a left pivot member 96 rotatably mounted to the pivot recession 92. The pivot recession 92 has a pivot hole 922 formed therein, and a stop portion 924 formed at the right side thereof. The first springy member 94 is a torsion spring. The left pivot member 96 has a main body 962, a pivot pole 964 extending vertically downward from a rear end of the main body 962 and corresponding to the pivot hole 922, and a fastening piece 966 protruding rightward from a front end of the main body 962. The pivot pole 964 is mounted to the pivot hole 922 to enable the left pivot member 96 to be rotatably mounted at a left side of a front end of the slide member 8. The first springy member 94 is provided with two ends contacting against the stop portion 924 and the left pivot member 96 respectively, for keeping the left pivot member 96 bouncing leftward.

The right card-fastening device 10 includes a right pivot recession 102 formed at a front end of the right sidewall 86, a second springy member 104, and a right pivot member 106 rotatably mounted to the right pivot recession 102. The right pivot recession 102 has a pivot hole 1022 formed therein, and a stop portion 1024 formed at the left side thereof. The second springy member 104 is a torsion spring. The right pivot member 106 has a main body 1062, a pivot pole 1064 extending vertically downward from a rear end of the main body 1062 and corresponding to the pivot hole 1022, and a fastening piece 1066 protruding leftward from a front end of the main body 1062. The pivot pole 1064 is mounted to the pivot hole 1022 to enable the right pivot member 106 to be rotatably mounted at a left side of the front end of the slide member 8. The second springy member 104 is provided with two ends contacting against the stop portion 1024 and the right pivot member 106 respectively, for keeping the right pivot member 106 bouncing rightward.

During the insertion of the card 7 into the card connector, the card 7 is inserted into the receiving chamber first. When the front end of the card 7 contacts against the rear sidewall 88 of the slide member 8 and the card 7 continues to be pushed to drive the slide member 8 to move toward the rear sidewall 14 of the base 1, the left pivot member 96 and the right pivot member 106 are forced by the left sidewall 16 and the right sidewall of the base 1 respectively to move toward the card 7. When the card 7 is fully inserted into the card connector, the contact pins (not shown) of the card 7 right contact the contact terminals 2 for electric conduction and the respective fastening pieces 966 and 1066 of the left and right pivot members 96 and 106 fasten the respective left and right sides of the rear end of the card 7. Because the left and right sidewalls 16 and 18 hold the left and right pivot members 96 and 106 respectively, the left and right pivot members 96 and 106 fail to bounce bilaterally outward, thus firmly holding the card 7 inside the card connector.

Although the present invention has been described with respect to the specific preferred embodiments thereof, it is no way limited to the details of the illustrated structures but changes and modifications may be made within the scope of the appended claims.

What is claimed is:

1. A drawer card connector comprising:
   a base having a bottom plate, a rear sidewall, a left sidewall, and a right sidewall, the latter three of which extend upward from said bottom plate;
   a cover member;
   an ejecting device;
   a slide member slidably mounted in said base and having a top plate, a left sidewall, a right sidewall, and a rear sidewall, said left, right, and rear sidewalls extending downward from said top plate;
   a plurality of contact terminals; and
   a left card-fastening device and a right card-fastening device rotatably mounted to respective left and right sides of a front end of said slide member, each of said left and right card-fastening devices having a fastening piece;
   wherein said bottom plate of said base and said top plate, said left sidewall, and said right sidewall of said slide member define a receiving chamber therebetween for receiving an electronic card;

whereby said left and right sidewalls of said base push against said left and right card-fastening devices to enable said two fastening pieces to fasten respective left and right sides of a rear end edge of said card while said card is fully inserted into said card connector.

2. The card connector as defined in claim 1, wherein said left card-fastening device comprises a springy fastening bar extending forward from a front end of said left sidewall of said slide member; said fastening piece of said left card-fastening device protrudes rightward from a front end of said fastening bar; said left sidewall of said base pushes said fastening bar to move rightward.

3. The card connector as defined in claim 1, wherein said right card-fastening device comprises a springy fastening bar extending leftward forward from a front end of said right sidewall of said slide member; said fastening piece of said right card-fastening device protrudes rightward from a front end of said fastening bar of said right card-fastening device; said right sidewall of said base pushes said fastening bar of said right card-fastening device to move leftward.

4. The card connector as defined in claim 1, wherein said left card-fastening device comprises a springy fastening bar extending forward from a front end of said left sidewall of said slide member; said fastening piece of said left card-fastening device protrudes rightward from a front end of said fastening bar; said left sidewall of said base pushes said fastening bar to move rightward; said right card-fastening device comprises a springy fastening bar extending forward from a front end of said right sidewall of said slide member; said fastening piece of said right card-fastening device protrudes rightward from a front end of said fastening bar of said right card-fastening device; said right sidewall of said base pushes said fastening bar of said right card-fastening device to move leftward.

5. The card connector as defined in claim 2 or 3 or 4, wherein said slide member further comprises a left positioning bar and a right positioning bar protruding forward from respective front ends of said left and right sidewalls thereof for guiding and positioning the card.

6. The card connector as defined in claim 1, wherein said left card-fastening device comprises a left pivot recession formed at a front end of a left side of said slide member, a first springy member, and a left pivot member rotatably mounted to said left pivoting recession, said left pivot recession having a stop portion formed at a right side thereof, said first springy member being a torsion spring, said left pivot member having a main body; said fastening piece of said left card-fastening device protrudes rightward from a front end of said main body of said left pivot member, said first springy member having two ends contacting against said stop portion of said left pivot recession and said left pivot member respectively for keeping said left pivot member bouncing leftward.

7. The card connector as defined in claim 1, wherein said right card-fastening device comprises a right pivot recession formed at a front end of a right side of said slide member, a second springy member, and a right pivot member rotatably mounted to said right pivoting recession, said right pivot recession having a stop portion formed at a left side thereof, said second springy member being a torsion spring, said right pivot member having a main body; said fastening piece of said right card-fastening device protrudes leftward from a front end of said main body of said right pivot member, said second springy member having two ends contacting against said stop portion of said right pivot recession and said right pivot member respectively for keeping said right pivot member bouncing rightward.

8. The card connector as defined in claim 1, wherein said left card-fastening device comprises a left pivot recession formed at a front end of a left side of said slide member, a first springy member, and a left pivot member rotatably mounted to said left pivoting recession, said left pivot recession having a stop portion formed at a right side thereof, said first springy member being a torsion spring, said left pivot member having a main body; said fastening piece of said left card-fastening device protrudes rightward from a front end of said main body of said left pivot member, said first springy member having two ends contacting against said stop portion of said left pivot recession and said left pivot member respectively for keeping said left pivot member bouncing leftward; said right card-fastening device comprises a right pivot recession formed at a front end of a right side of said slide member, a second springy member, and a right pivot member rotatably mounted to said right pivoting recession, said right pivot recession having a stop portion formed at a left side thereof, said second springy member being a torsion spring, said right pivot member having a main body; said fastening piece of said right card-fastening device protrudes leftward from a front end of said main body of said right pivot member, said second springy member having two ends contacting against said stop portion of said right pivot recession and said right pivot member respectively for keeping said right pivot member bouncing rightward.

9. The card connector as defined in claim 6 or 8, wherein said left pivot recession comprises a pivot hole formed therein; said left pivot member comprises a pivot pole extending vertically downward from a rear end of said main body of said left pivot member and corresponding to said pivot hole of said left pivot recession, whereby said pivot pole is mounted into said pivot hole to enable said left pivot member to be rotatably mounted to said slide member.

10. The card connector as defined in claim 7 or 8, wherein said right pivot recession comprises a pivot hole formed therein; said right pivot member comprises a pivot pole extending vertically downward from a rear end of said main body of said right pivot member and corresponding to said pivot hole of said right pivot recession, whereby said pivot pole is mounted into said pivot hole to enable said right pivot member to be rotatably mounted to said slide member.

* * * * *